(12) United States Patent
Hashimoto et al.

(10) Patent No.: US 12,305,935 B2
(45) Date of Patent: May 20, 2025

(54) METHOD OF PRODUCING PLATE LAMINATE UNIT FOR HEAT EXCHANGER

(71) Applicant: MAYEKAWA MFG. CO., LTD., Tokyo (JP)

(72) Inventors: Daisaku Hashimoto, Tokyo (JP); Yasuchika Kashihara, Tokyo (JP); Daisuke Miyazaki, Tokyo (JP); Hideki Shudai, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 18/697,096

(22) PCT Filed: Nov. 28, 2022

(86) PCT No.: PCT/JP2022/043654
§ 371 (c)(1),
(2) Date: Mar. 29, 2024

(87) PCT Pub. No.: WO2023/100779
PCT Pub. Date: Jun. 8, 2023

(65) Prior Publication Data
US 2025/0035388 A1    Jan. 30, 2025

(30) Foreign Application Priority Data
Dec. 2, 2021  (JP) ................................ 2021-195869

(51) Int. Cl.
*B23P 15/26*    (2006.01)
*F28F 3/08*     (2006.01)

(52) U.S. Cl.
CPC ............ *F28F 3/08* (2013.01); *F28F 2255/08* (2013.01)

(58) Field of Classification Search
CPC .. F28F 3/08; F28F 2255/08; F28F 3/04; F28F 3/10; F28F 3/046; B23P 2700/12;
(Continued)

(56) References Cited

U.S. PATENT DOCUMENTS
2022/0241905 A1    8/2022  Yamada et al.

FOREIGN PATENT DOCUMENTS
EP    2802835 B1    9/2018
IN    202141015190 A  *  7/2022  ............. B23P 15/26
(Continued)

OTHER PUBLICATIONS
English translation of JP-7269339-B2 (Year: 2023).*
(Continued)

*Primary Examiner* — Jun S Yoo
(74) *Attorney, Agent, or Firm* — ROSSI, KIMMS & McDOWELL LLP (57) ABSTRACT

A method of producing a plate laminate unit for a heat exchanger includes: a compressing step of compressing a plate laminate, a pair of terminal plates disposed on both sides of the plate laminate in a laminating direction, and a pair of binding plates disposed on both sides of the pair of terminal plates in the laminating direction, using a pressing tool from both sides in the laminating direction; a welding step of welding an edge portion of the plate laminate to edge portions of the pair of terminal plates during the compressing step; a connecting step of connecting the pair of binding plates to each other by a connector after the welding step; and a pressure-releasing step of detaching the pressing tool after the connecting step.

6 Claims, 10 Drawing Sheets

(58) Field of Classification Search
CPC ....... B23P 15/26; B21D 53/04; B21D 39/028; B23K 37/04
See application file for complete search history.

(56) References Cited

FOREIGN PATENT DOCUMENTS

| | | | | |
|---|---|---|---|---|
| JP | 2012057900 | A | 3/2012 | |
| JP | 2013196849 | A | 9/2013 | |
| JP | 2015505027 | A | 2/2015 | |
| JP | 5690532 | B2 | 3/2015 | |
| JP | 2018204887 | A | 12/2018 | |
| JP | 7269339 | B2 * | 5/2023 | ........... B23K 37/047 |
| WO | 2020250293 | A1 | 12/2020 | |
| WO | WO-2022059447 | A1 * | 3/2022 | .............. F16B 2/065 |

OTHER PUBLICATIONS

English translation of WO-2022059447-A1 (Year: 2022).*
English translation of IN-202141015190-A (Year: 2022).*
International Search Report issued in Intl. Appln. No. PCT/JP2022/043654, mailed Feb. 14, 2023. English translation provided.
Written Opinion issued in Intl. Appln. No. PCT/JP2022/043654, mailed Feb. 14, 2023.
English translation of Written Opinion issued in Intl. Appln. No. PCT/JP2022/043654, mailed Feb. 14, 2023, previously cited in IDS filed Mar. 29, 2024.
International Preliminary Report on Patentability issued in Intl. Appln. No. PCT/JP2022/043654 mailed Jun. 13, 2024. English translation provided.

* cited by examiner

<BEFORE PRESSURE-RELEASING STEP>   <AFTER PRESSURE-RELEASING STEP>

F₁, F₂  COMPRESSION FORCE

F₁ < F₂

METHOD OF PRODUCING PLATE LAMINATE UNIT FOR HEAT EXCHANGER

TECHNICAL FIELD

The present disclosure relates to a method of producing a plate laminate unit for a heat exchanger.

BACKGROUND

The heat exchanger disclosed in Patent Document 1 contains a plate laminate configured to exchange heat between $CO_2$ refrigerant and $NH_3$ refrigerant. The plate laminate includes a plurality of plates welded together and a pair of terminal plates that sandwiches the plurality of plates from both sides in the laminating direction. One of the pairs of terminal plates illustrated in this document closes the flow path for the $CO_2$ refrigerant. The other terminal plate has an inlet tube and an outlet tube. Both the inlet and outlet tubes communicate with the $CO_2$ refrigerant path formed in the plate laminate.

CITATION LIST

Patent Literature

Patent Document 1: JP5690532B

SUMMARY

Problems to be Solved

The edge portions of the pair of terminal plates must be properly welded to the edge portion of the plate laminate to prevent leakage of the $CO_2$ refrigerant. In this regard, Patent Document 1 does not disclose any specific method for proper welding.

An object of the present disclosure is to provide a method of producing a plate laminate unit for a heat exchanger whereby it is possible to properly weld a pair of terminal plates and a plate laminate.

Solution to the Problems

A method of producing a plate laminate unit for a heat exchanger according to at least one embodiment of the present disclosure includes: a compressing step of compressing a plate laminate, a pair of terminal plates disposed on both sides of the plate laminate in a laminating direction, and a pair of binding plates disposed on both sides of the pair of terminal plates in the laminating direction, using a pressing tool from both sides in the laminating direction; a welding step of welding an edge portion of the plate laminate to edge portions of the pair of terminal plates during the compressing step; a connecting step of connecting the pair of binding plates to each other by a connector after the welding step; and a pressure-releasing step of detaching the pressing tool after the connecting step.

Advantageous Effects

The present disclosure provides a method of producing a plate laminate unit for a heat exchanger whereby it is possible to properly weld a pair of terminal plates and a plate laminate.

DETAILED DESCRIPTION

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features can be indicated by the same reference numerals and not described in detail.

1. Example of Overview of Heat Exchanger 30

Figure 1:
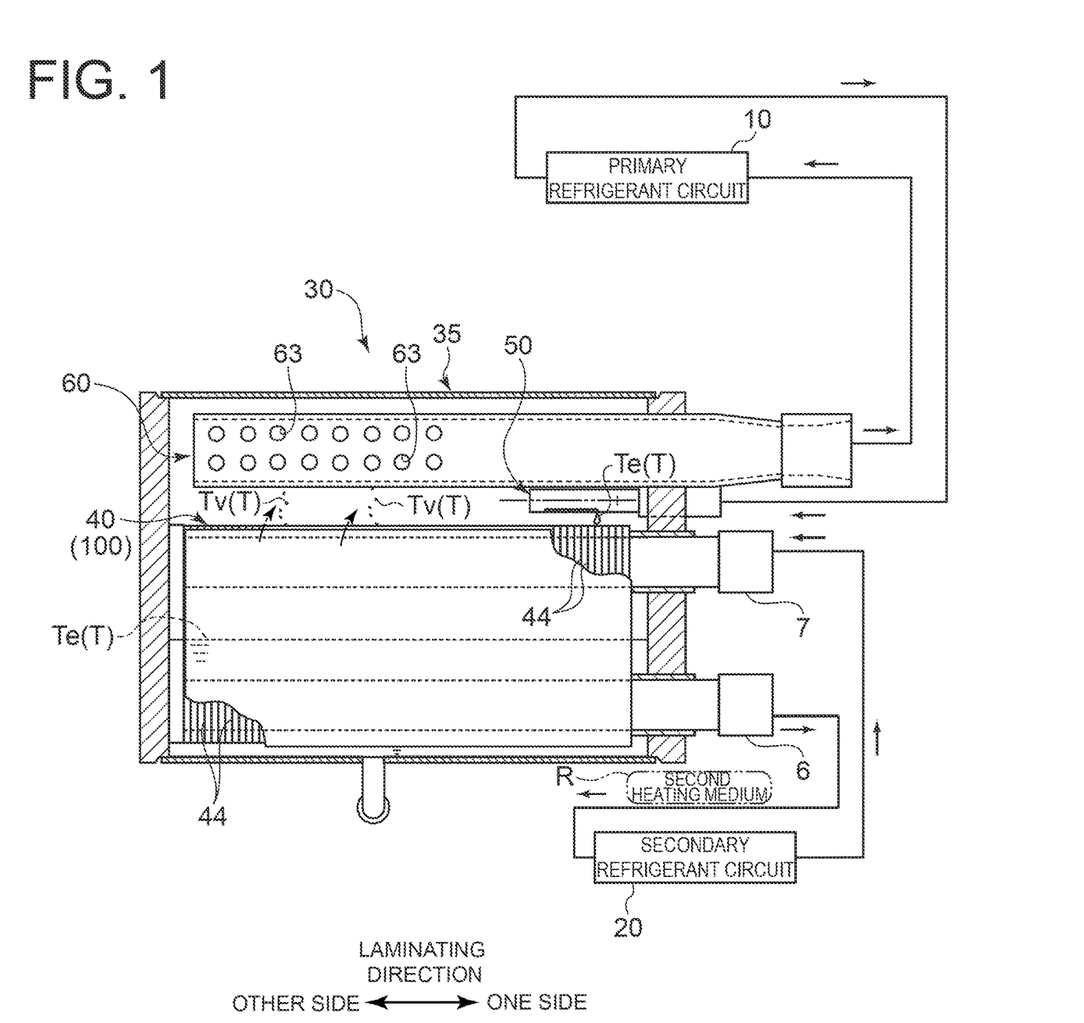
FIG. 1 is a conceptual cross-sectional view of a heat exchanger according to an embodiment.

FIG. 1 is a conceptual cross-sectional view of a heat exchanger 30 according to an embodiment of the present disclosure. The heat exchanger 30 is configured so that a first heating medium T to circulate through a primary refrigerant circuit 10 and a second heating medium R to circulate through a secondary refrigerant circuit 20 exchange heat with each other. The first heating medium T is $NH_3$ in the gas or liquid phase as an example, and the second heating medium R is $CO_2$ in the liquid phase as an example. The first heating medium T and the second heating medium R may be other fluids than those mentioned above.

The first heating medium liquid Te, which is the first heating medium T in the liquid phase flowing into the heat exchanger 30, is transformed into the first heating medium gas Tv by the heat obtained from the second heating medium R. In other words, in the primary refrigerant circuit 10, the heat exchanger 30 functions as an evaporator for the first heating medium T. The flow phase of the first heating medium T flowing into the heat exchanger 30 may be gas-liquid two-phase. The first heating medium gas Tv flowing out of the heat exchanger 30 transforms to the first heating medium liquid Te in the process of circulating in the primary refrigerant circuit 10 and returns to the heat exchanger 30. The primary refrigerant circuit 10 includes a compressor, a condenser, and an expansion valve. On the other hand, the cold energy of the second heating medium R cooled by heat exchange with the first heating medium T is extracted in the process of circulating in the secondary refrigerant circuit 20. The second heating medium R is heated up and returns to the heat exchanger 30. The secondary refrigerant circuit 20 includes a liquid receiver (receiver), a pump, and a cooler. The cooler is configured to extract cold energy from the second heating medium R. For example, the cooler may be configured to exchange heat between the second heating medium R circulating in the secondary refrigerant circuit 20 and a heating medium such as air circulating in a freezer.

The heat exchanger 30 in this example is a plate heat exchanger, more specifically a shell-and-plate heat exchanger. The heat exchanger 30 includes, for example, a vessel 35 in which a liquid pool of the first heating medium liquid Te is formed, and a plate laminate unit 100 which is immersed in the liquid pool of the first heating medium liquid Te. The vessel 35 in this example is formed in a cylindrical shape extending in the laminating direction of the plate laminate 40 included in the plate laminate unit 100. The vessel 35 is provided with a delivery tube 50 for delivering the first heating medium liquid Te to the plate laminate 40 and a discharge duct 60 for discharging the first heating medium gas Tv produced inside the vessel 35. The discharge duct 60 has a plurality of communication openings 63 through which the first heating medium gas Tv can flow into the duct. In this example, the second heating medium R flows inside the plate laminate 40 immersed in the pool of the first heating medium liquid Te, where the first heating medium liquid Te and the second heating medium R exchange heat. The first heating medium gas Tv produced by the heat exchange is discharged from the heat exchanger 30 through the discharge duct 60.

2. Example of Configuration of Plate Laminate Unit 100

Figure 2:
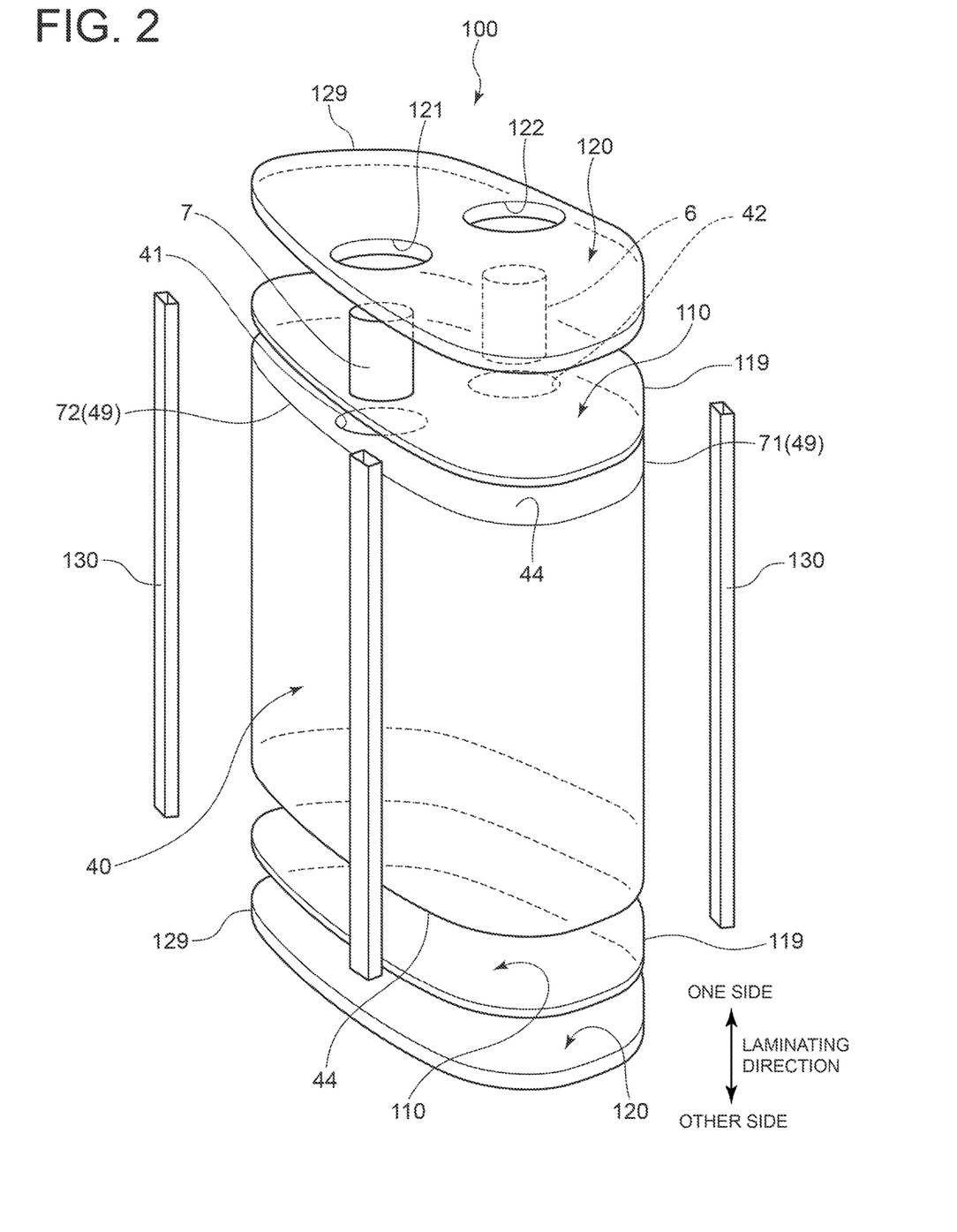
FIG. 2 is a conceptual exploded perspective view of a plate laminate unit according to an embodiment.
Figure 3:
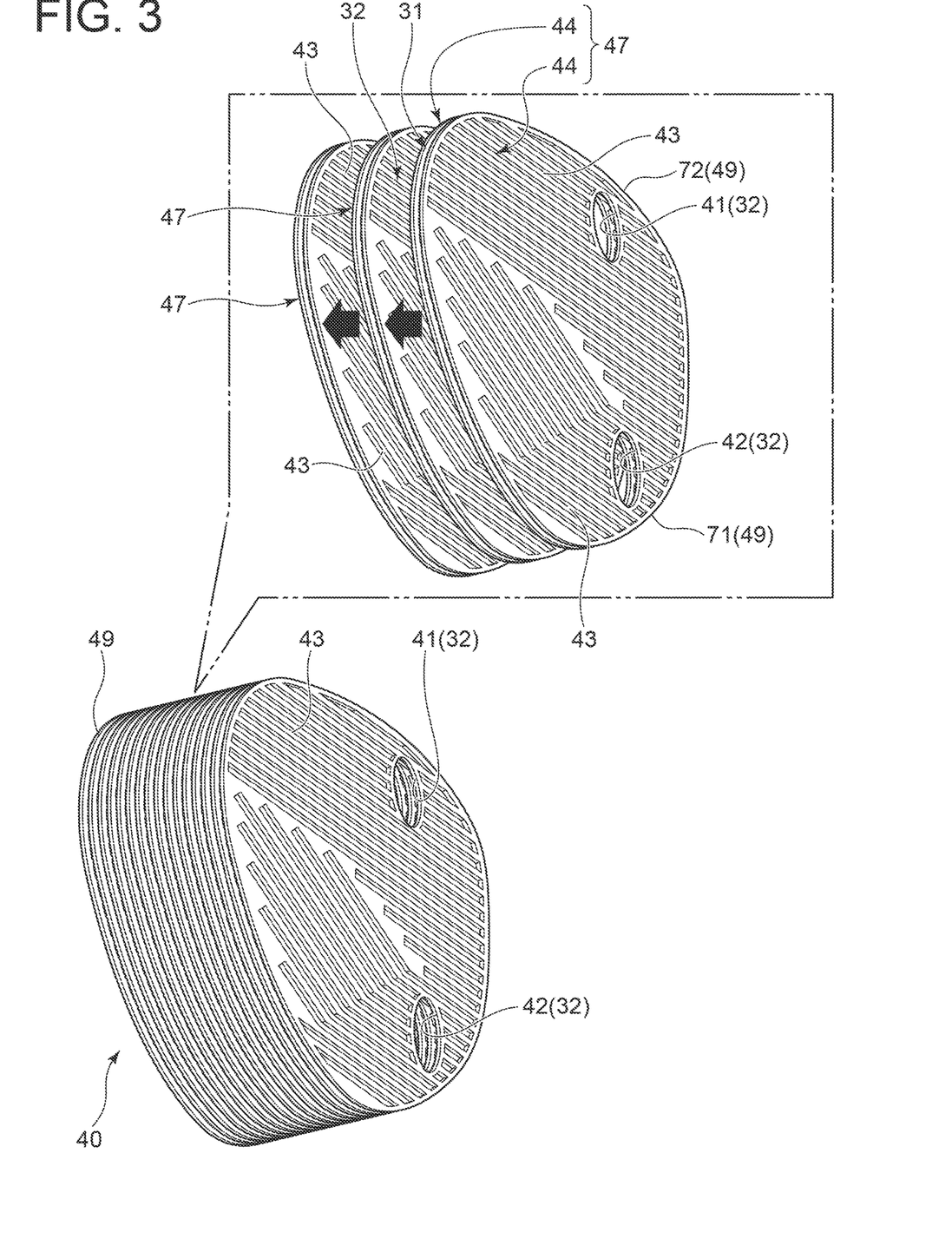
FIG. 3 is a conceptual perspective view of a plate laminate according to an embodiment.
Figure 4:
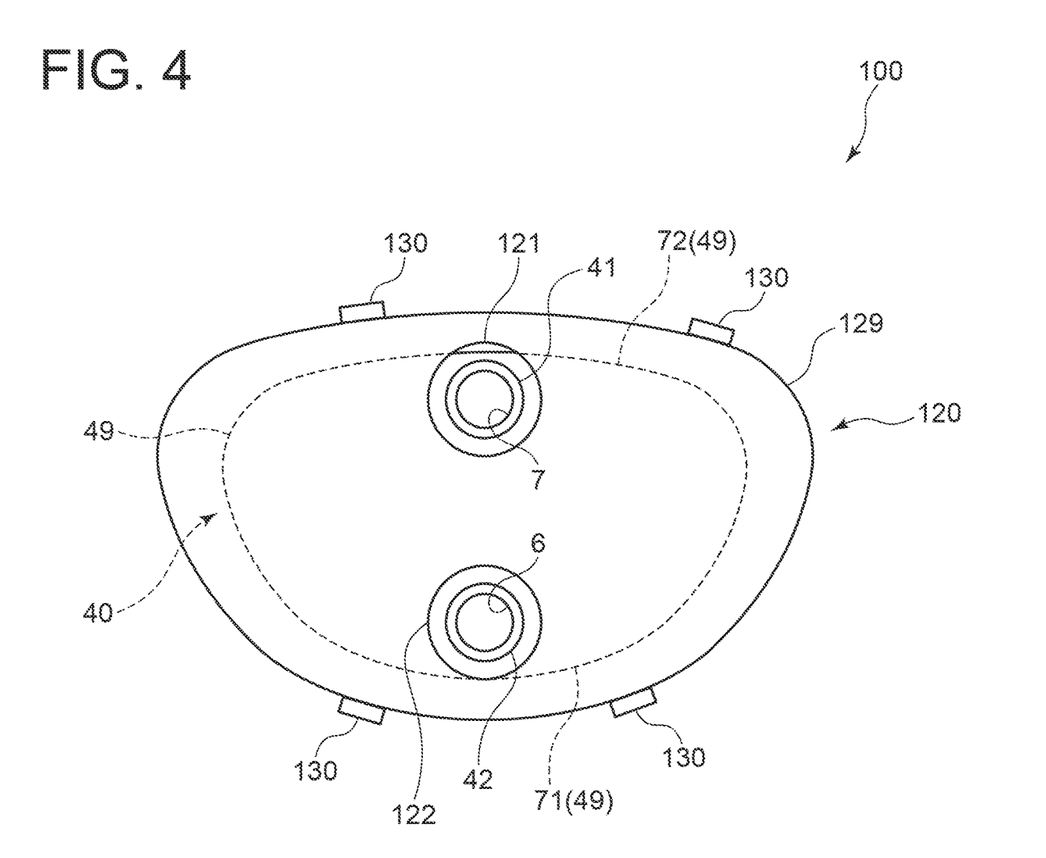
FIG. 4 is a conceptual explanatory view of a plate laminate unit according to an embodiment in laminating direction view.

FIG. 2 is a conceptual exploded perspective view of the plate laminate unit 100 according to an embodiment of the present disclosure. FIG. 3 is a conceptual perspective view of the plate laminate 40 according to an embodiment of the present disclosure. FIG. 4 is a conceptual explanatory view of the plate laminate unit 100 according to an embodiment of the present disclosure in laminating direction view.

As shown in FIG. 2, the plate laminate unit 100 includes a plate laminate 40 comprising a plurality of laminated plates 44. The laminating direction of the plate laminate 40 coincides with the thickness direction of each plate 44. The plate laminate unit 100 further includes a pair of terminal plates 110 disposed on both sides of the plate laminate 40 in the laminating direction, a pair of binding plates 120 disposed on both sides of the pair of terminal plates 110 in the laminating direction, and a connector 130 connecting the pair of binding plates 120 to each other.

As shown in FIGS. 2 and 3, each of the plurality of plates 44 of the plate laminate 40 has a first communication opening 41 and a second communication opening 42. Both the first communication opening 41 and the second communication opening 42 form parts of a second flow path 32, which is the flow path for the second heating medium R. The wall surface of each plate 44 has a plurality of linearly-extending corrugated portions 43. The corrugated portions 43 are formed by press working as an example; a corrugated portion 43 on one side is protruded, and the corrugated portion 43 on the other side is recessed. It is understood that the space between protruded portions, which correspond to the plurality of corrugated portions 43 on one side, are recessed portions. In accordance with the same concept, it is understood that the space between recessed portions, which correspond to the plurality of corrugated portions 43 on the other side, are protruded portions.

As shown in FIG. 3, the plate laminate 40 has multiple sets of paired plates 47 each of which is composed of a pair of plates 44. In the pair of plates 44, the edge portions of the two first communication openings 41 are welded together, and the edge portions of the two second communication openings 42 are welded together. The outer edge portions 49 of the pair of plates 44 are not welded, so a first flow path 31, which is the flow path for the first heating medium T, is formed between the pair of plates 44. The respective inner spaces of the first communication openings 41 and the second communication openings 42 are separated from the first flow path 31 by welds formed at the edge portions of the first communication openings 41 and the second communication openings 42. The pair of plates 44 constituting each paired plate 47 are arranged so that the protruded portions of the corrugated portions 43 face each other. The pair of plates 44 are pressed against each other (compressed) so that these corrugated portions 43 are in close contact with each other, which increases the flow path length of the first flow path 31 and promotes heat exchange between the first heating medium T and the second heating medium R.

Two sets of paired plates 47 adjacent to each other in the laminating direction are welded together at their outer edge portions 49. This creates the second flow path 32 for the second heating medium R between the two paired plates 47, which is separated from the interior space of the vessel 35.

The first communication opening 41 on one side in the laminating direction of the plate laminate 40 having the above configuration communicates with an inlet tube 7, and the second communication opening 42 communicates with an outlet tube 6. The edge portion 49 of each plate 44 in this embodiment has a first edge portion 71 of arc shape and a second edge portion 72 with a smaller curvature than the first edge portion 71. Accordingly, each plate 44 has a longitudinal direction and a transverse direction in laminating direction view. The second edge portion 72 is longer in the longitudinal direction than the first edge portion 71 and is located above the first edge portion 71. Therefore, the first heating medium liquid Te delivered from the delivery tube 50 easily hits each plate 44, promoting heat exchange between the first heating medium T and the second heating medium R. The second edge portion 72 may be curved or flattened. On the other hand, the first edge portion 71, which is located on the lower side, does not necessarily have to present a shape that is easily hit by the delivered first heating medium liquid Te. The smaller the gap between the first edge portion 71 and the inner wall surface of the vessel 35, the larger the plate 44 can be, and the more heat exchange between the first heating medium T and the second heating medium R can be promoted. Therefore, the first edge portion 71 is preferably arc-shaped in accordance with the cylindrical vessel 35. In other embodiments, each plate 44 may be circular or oval.

Returning to FIG. 2, each of the pair of terminal plates 110 has substantially the same external shape as the plurality of plates 44. The pair of terminal plates 110 are welded to the outermost pair of plates 44 in the laminating direction of the plurality of plates 44, respectively. As a more specific example, the edge portion 49 of each plate 44 and the edge portion 119 of each terminal plate 110 are welded together along their entire circumferential length. The inlet tube 7 and the outlet tube 6 are welded to the terminal plate 110 on one side in the laminating direction. As described above, the inlet tube 7 and the outlet tube 6 respectively communicate with the first communication opening 41 and the second communication opening 42 of the plate 44 located on one side.

The binding plate 120 shown in FIGS. 2 and 4 has a first opening 121 and a second opening 122 through which the inlet tube 7 and the outlet tube 6 are placed inside, respectively (the terminal plate 110 is not shown in FIG. 4). The edge portion 129 of the binding plate 120 is formed to surround the edge portion 49 of the plate laminate 40 in laminating direction view. In other words, in laminating direction view, the edge portion 129 is located outward of the edge portion 49 over the entire circumferential length of the edge portion 129. The connector 130 is a bar extending in the laminating direction. In this example, the ends of each of a plurality of connectors 130 are welded to the respective edge portions 129 of the pair of binding plates 120. Since the edge portion 129 is located outward of the edge portion 49 in laminating direction view, the plurality of connectors 130 are all separated from the plate laminate 40 and the pair of terminal plates 110.

As described above, the plate laminate 40 is placed in a compressed state, and at least a portion of the plate laminate 40 is elastically deformed in the laminating direction. The pair of binding plates 120 and the connector 130 prevent the compressed plate laminate 40 from returning to the original position. In other words, tensile stress due to the restoring force of the plate laminate 40 acts on the plurality of connectors 130. A portion of the compressed plate laminate 40 may be plastically deformed.

3. Example of Method of Producing Plate Laminate Unit 100

Figure 5:
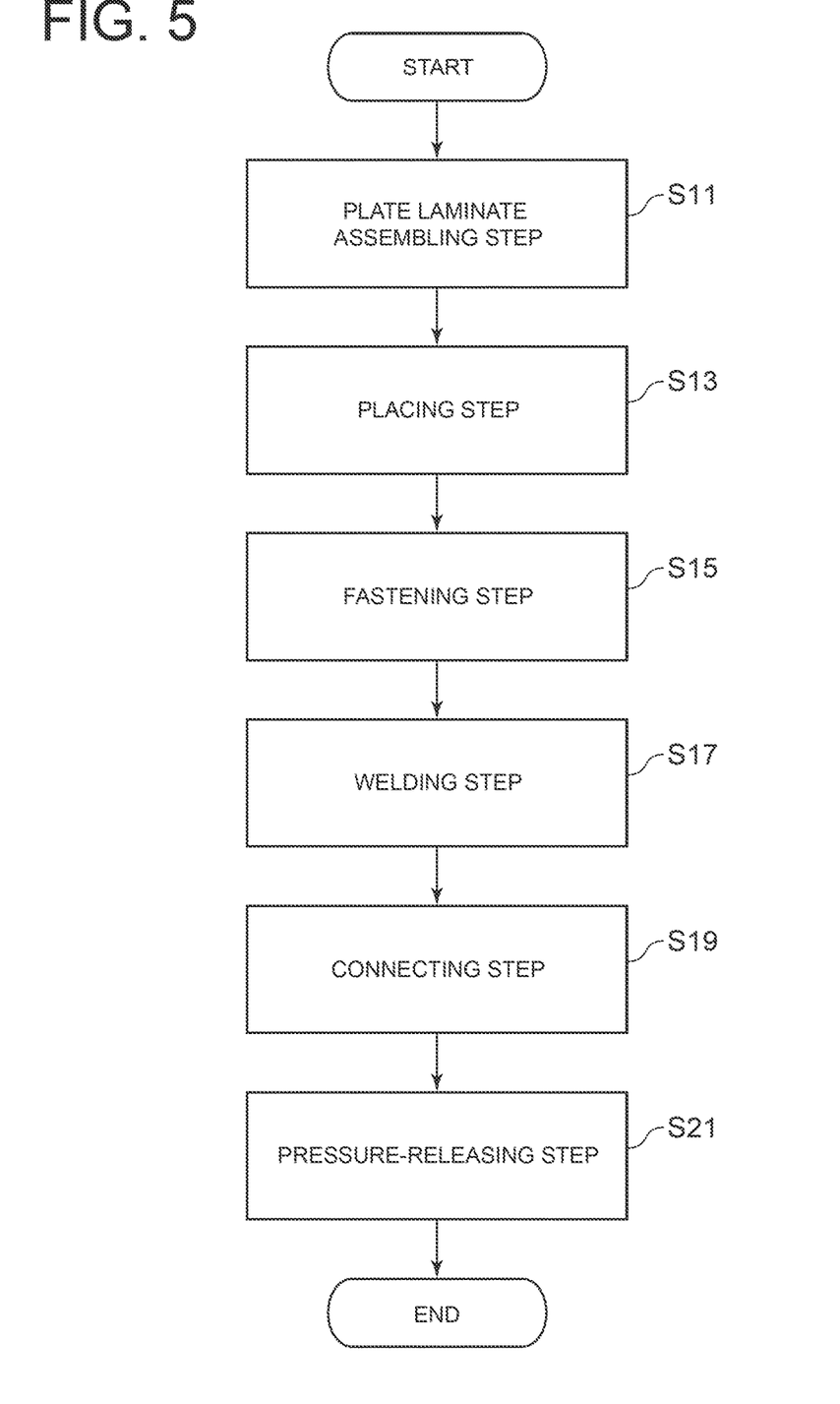
FIG. 5 is a flowchart of the method of producing a plate laminate unit according to an embodiment.
Figure 6:
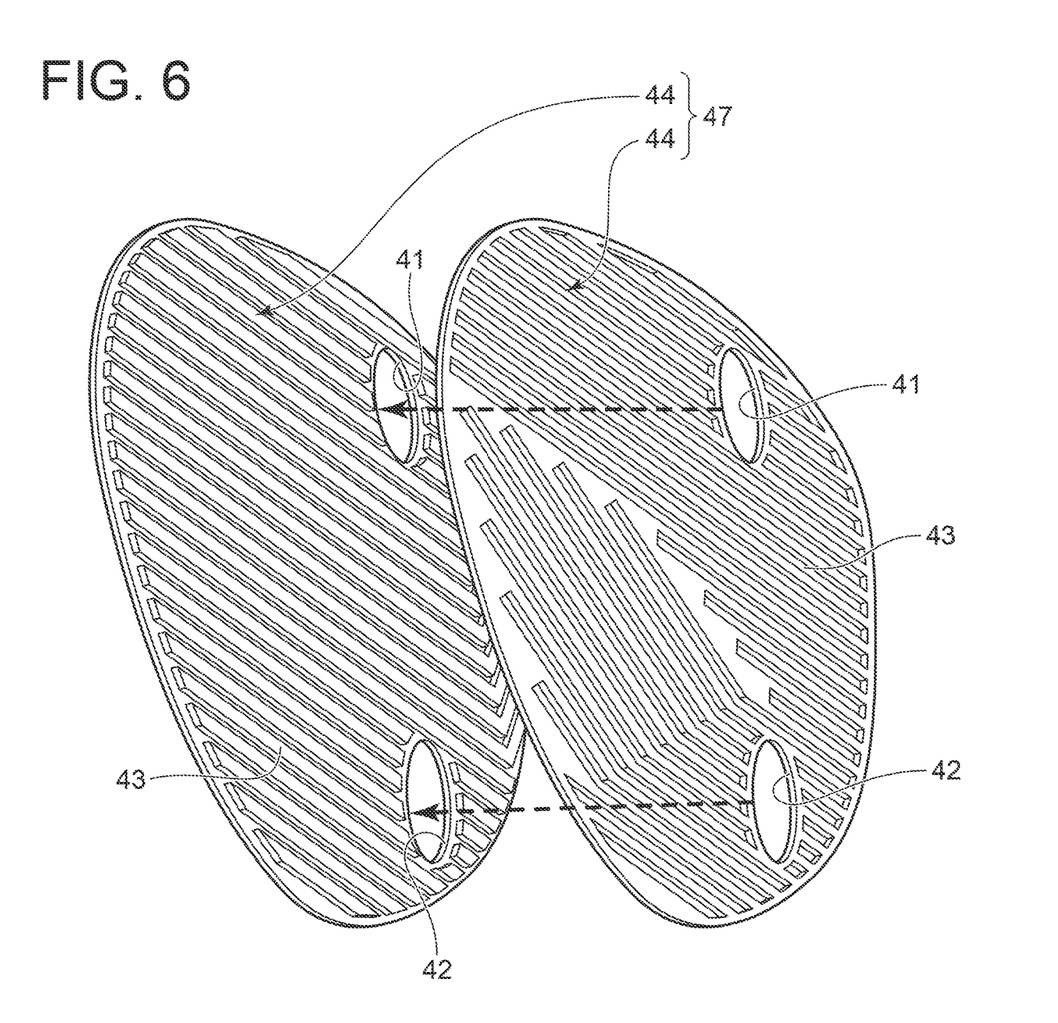
FIG. 6 is a conceptual explanatory view of the method of assembling a paired plate according to an embodiment.
Figure 7:
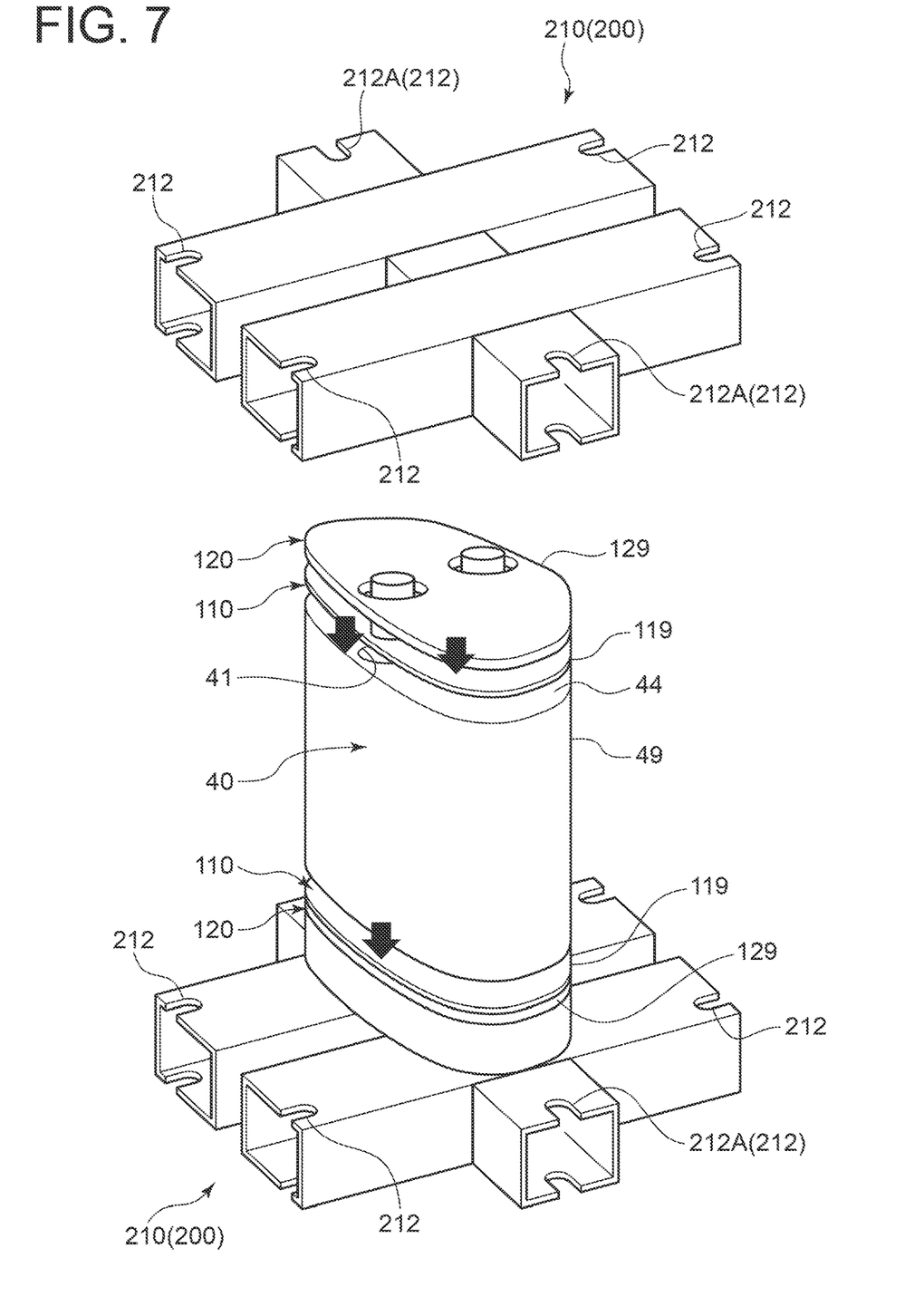
FIG. 7 is a conceptual explanatory view of the placing step according to an embodiment.
Figure 8:
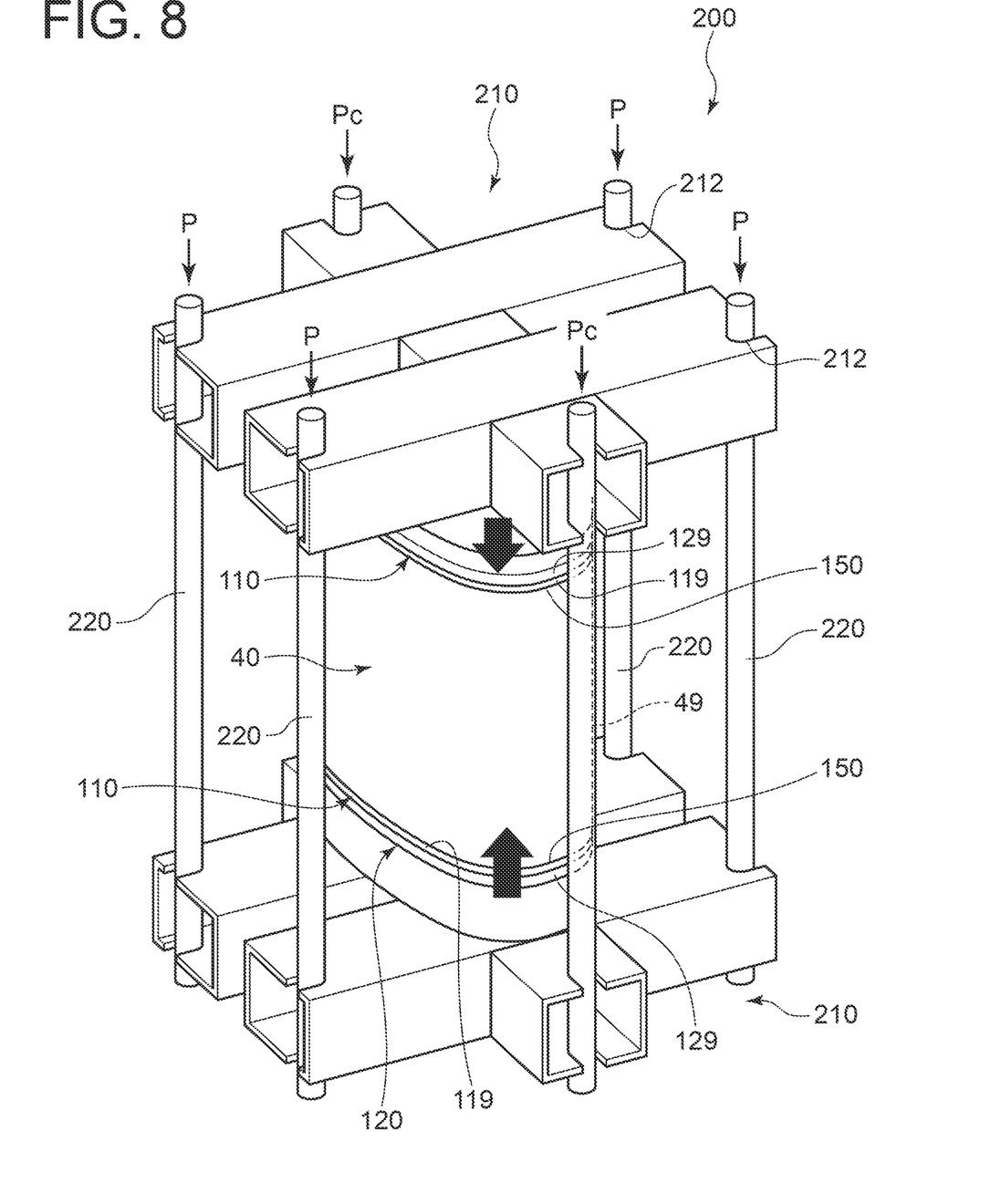
FIG. 8 is a conceptual explanatory view of the fastening step according to an embodiment.
Figure 9:
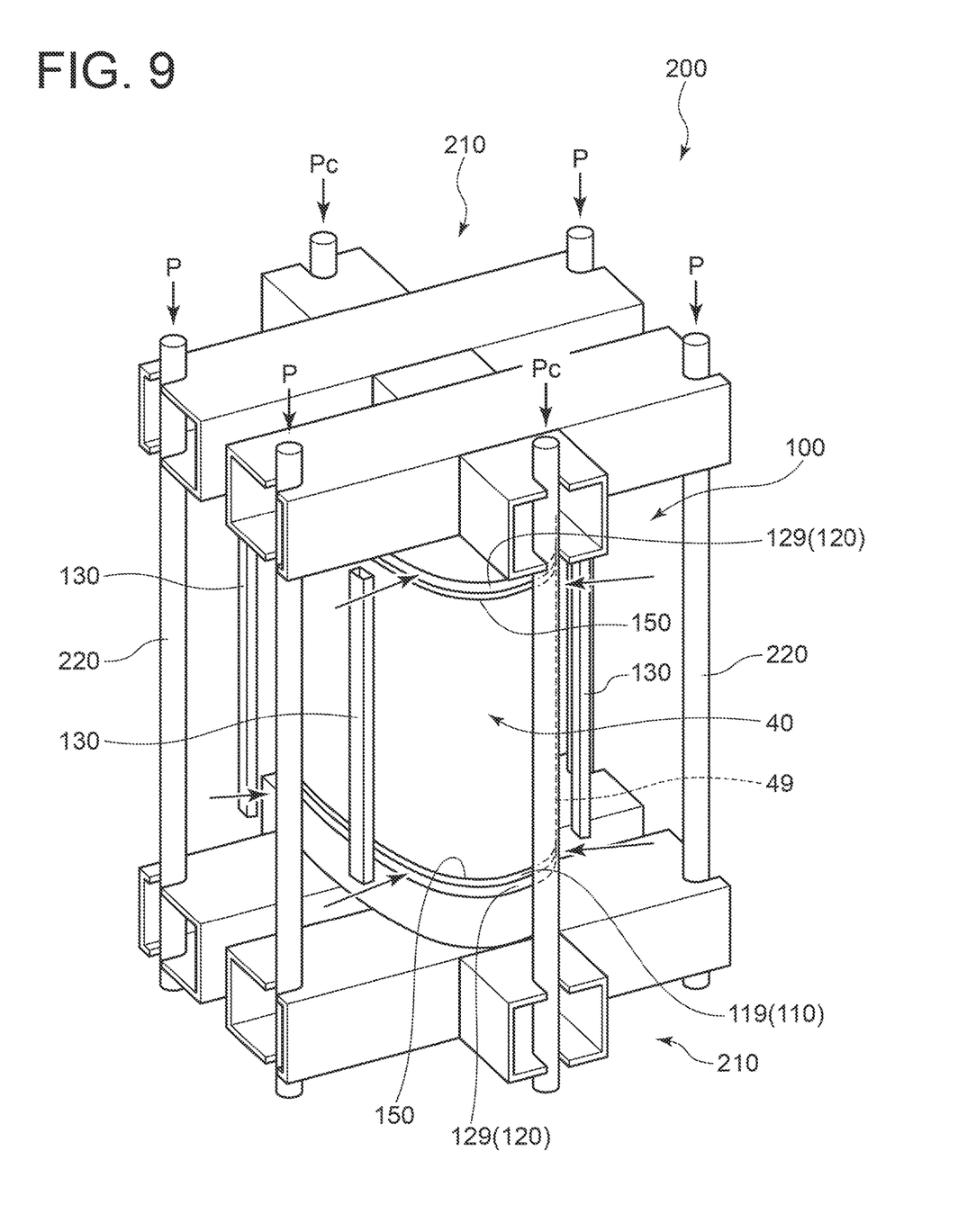
FIG. 9 is a conceptual explanatory view of the connecting step according to an embodiment.

FIG. 5 is a flowchart of the method of producing the plate laminate unit 100 for a heat exchanger according to an embodiment of the present disclosure (in the following description, "step" may be abbreviated as "S"). FIG. 6 is a conceptual explanatory view of the method of assembling the paired plate 47 according to an embodiment of the present disclosure. FIG. 7 is a conceptual explanatory view of the placing step according to an embodiment of the present disclosure. FIG. 8 is a conceptual explanatory view of the fastening step according to an embodiment of the present disclosure. FIG. 9 is a conceptual explanatory view of the connecting step according to an embodiment of the present disclosure.

As shown in FIG. 5, first, the step of assembling the plate laminate 40 is performed (S11). For example, as shown in FIG. 6, the edge portions of respective first communication openings 41 of a pair of plates 44 are welded together, and the edge portions of respective second communication openings 42 are welded together. Thus, the paired plate 47 is completed. At this time, respective corrugated portions 43 of the pair of plates 44 do not have to be adhered to each other. The process of producing the paired plate 47 is repeated, and multiple sets of paired plates 47 are prepared. Then, the process of welding the edge portions 49 of one set of pared plates 47 is repeated, as shown in FIG. 3. Thus, the assembly of the plate laminate 40 is completed.

Returning to FIG. 5, various components necessary to produce the plate laminate unit 100 are placed (S13). For example, a pressing tool 200 for compressing the plate laminate unit 100 is prepared, as shown in FIG. 7. The pressing tool 200 includes a pair of pressing tables 210, a plurality of fastening shafts 220 (see FIG. 8), and a plurality of nuts (not shown). On one of the pressing tables located at the bottom, the binding plate 120, the terminal plate 110, the plate laminate 40, the terminal plate 110, and the binding plate 120 are placed in order from the bottom. The other pressing table 210 is then placed on the top of the binding plate 120. Thus, the plate laminate 40, the pair of terminal plates 110, the pair of binding plates 120, and the pair of pressing tables 210 are placed in order from the inside in the laminating direction (from the center side in the laminating direction of the plate laminate 40).

The edge portions of the pressing tables 210 surround the pair of binding plates 120 in laminating direction view. In other words, in laminating direction view, the edge portions of the pressing tables 210 are located outward of the edge portions 129 of the binding plates 120 over the entire circumferential length. Further, each pressing table 210 has a plurality of insertion holes 212. The plurality of insertion holes 212 are all located outward of the edge portions 129 of the pair of binding plates 120 in laminating direction view. In other words, each insertion hole 212 is in a position off the plate laminate 40, the pair of terminal plates 110, and the pair of binding plates 120 in the laminating direction. The plurality of insertion holes 212 are open in the laminating direction and also open along the horizontal direction perpendicular to the laminating direction. Further, two insertion holes 212A of the plurality of insertion holes 212 are located such that both longitudinal ends of each plate 44 are interposed between the two holes in laminating direction view.

Returning to FIG. 5, the fastening step is executed to tighten the pair of pressing tables 210 of the pressing tool 200 (S15). For example, as shown in FIG. 8, the plurality of fastening shafts 220 are inserted into the plurality of insertion holes 212, respectively. The outer peripheral surface of each fastening shaft 220 is threaded, and a plurality of nuts (not shown) are attached to the upper end portions of the plurality of inserted fastening shafts 220, respectively. Each nut is tightened so that it is pressed against the pressing table 210 from above. This applies a pressing force to the upper pressing table 210 to tighten the pair of pressing tables 210. In other words, the pair of pressing tables 210 applies a compression force to the plate laminate 40 via the pair of binding plates 120 and the pair of terminal plates 110. As a result, the plate laminate 40 is compressed, and the corrugated portions 43 of the two plates 44 constituting the paired plate 47 come into close contact with each other. Further, the pair of binding plates 120 come closer to each other as the plate laminate 40 is compressed.

The contact positions between the edges of the plurality of insertion holes 212 and the plurality of nuts are input points P where the pressing force is applied. The number of input points P in this example is six. The plurality of input points P are located so as to surround the plate laminate 40 in laminating direction view. Different pressing forces act in at least two of the plurality of input points P on the upper pressing table 210. In other words, the amount of nut tightening varies among at least two of the plurality of input points P. The advantages of different pressing forces are discussed below.

To add, when the fastening shaft 220 is inserted into the insertion hole 212 along the vertical direction, the more the length of the plate laminate 40 in the laminating direction increases, the more the workability of insertion may decrease. In this regard, in this embodiment, since each insertion hole 212 is open in the horizontal direction, the fastening shaft 220 can be inserted into the insertion hole 212 along the horizontal direction. Therefore, even if the plate laminate 40 is long in the laminating direction, the workability of insertion is not impaired.

Returning to FIGS. 5 and 8, the welding step is executed to weld the edge portion 49 of the plate laminate 40 to the edge portions 119 of the pair of terminal plates 110 (S17). At this time, with pressure applied by the pressing tool 200, the edge portions 49 and 119 are in close contact with each other over the entire circumferential length. Welding is performed along these edge portions 49 and 119 in close contact. Thus, weld portions 150 are properly formed along their entire circumferential length.

As shown in FIGS. 5 and 9, the connecting step is then executed to connect the pair of binding plates 120 to each other by the connector 130 (S19). In the example of FIG. 9, the ends of each of the plurality of connectors 130 extending in the laminating direction are connected to the respective edge portions 129 of the pair of binding plates 120 by welding. Thus, the plate laminate unit 100 is assembled while being pressed by the pressing tool 200.

Returning to FIG. 5, the pressure-releasing step is executed to detach the pressing tool 200 (S21). More specifically, the plurality of nuts are removed from the plurality of fastening shafts 220, respectively. This ends the compression using the pressing tool 200, but the plate laminate 40 is still restrained in a compressed state by the pair of binding plates 120 and the connector 130. Therefore, even after the compression by the pressing tool 200 is completed, the plate laminate 40 remains compressed with almost no restoration. The plurality of fastening shafts 220 and the upper pressing table 210 are then removed, and the plate laminate unit 100 is taken out. The production of the plate laminate unit 100 is thus completed. The portable plate laminate unit 100 is then housed in the vessel 35 of the heat exchanger 30.

With the above configuration, through the execution of S13 and S15, the compressing step of compressing the plate laminate 40, the pair of terminal plates 110, and the pair of binding plates 120 using the pressing tool 200 from both sides in the laminating direction, the edge portion 49 of the plate laminate 40 can be brought into close contact with the edge portions 119 of the pair of terminal plates 110 over the entire circumferential length. Since the welding step (S17) is executed with the edge portions 49, 119 in close contact, the edge portions 49, 119 can be properly welded over the entire circumferential length. Additionally, since the edge portions 49, 119 are welded before the connecting step (S19), the connector 130 does not interfere with the welding step (S17). From the above, it is possible to achieve the method of producing the plate laminate unit 100 for a heat exchanger by which the plate laminate 40 and the pair of terminal plates 110 can be welded easily and properly. Further, even after the pressure-releasing process (S21) is executed, the connector 130 prevents the compressed plate laminate 40 from returning to the original position, and tensile stress at the weld portions 150 is suppressed. More specifically, even if a large force is generated to separate the plate laminate 40 from the terminal plates 110 due to the second heating medium R as a high-pressure fluid flowing through the second flow path 32 of the plate laminate 40, the connector 130 receives this force, thereby suppressing tensile stress at the weld portions 150. Therefore, it is possible to achieve the method of producing the plate laminate unit 100 for a heat exchanger that can be applied to the use of the heat exchanger 30.

In the fastening step (S15), in each of a plurality of positions (in this embodiment, a plurality of input points P) off the plate laminate 40, the pair of terminal plates 110, and the pair of binding plates 120 in laminating direction view, the pair of pressing tables 210 are tightened using the plurality of fastening shafts 220 included in the pressing tool 200. With the above configuration, the pair of pressing tables 210 are tightened with the plurality of fastening shafts 220 separated from the plate laminate 40, the terminal plates 110, and the pair of binding plates 120. This ensures that the plurality of fastening shafts 220 do not interfere with the execution of the welding step (S17) after the fastening step. Thus, the welding step can be simplified.

Further, in the connecting step (S19), the edge portions 129 of the pair of binding plates 120, which are formed to surround the plate laminate 40 in laminating direction view, are connected by the connector 130. With the above configuration, since the edge portions 129 of the binding plates 120 are formed to surround the plate laminate 40 in laminating direction view, the connector 130 is separated from the plate laminate 40 and connected to the pair of binding plates 120. Therefore, the plate laminate 40 does not interfere with the execution of the connecting step (S19), and the connecting step (S19) can be simplified.

The plate laminate 40 includes a plurality of plates 44 with corrugated portions 43 forming the first flow path 31 and the second flow path 32. In S13 and S15, which correspond to the compressing step described above, the respective corrugated portions 43 of two plates 44 adjacent to each other in the laminating direction of the plurality of plates 44 are brought into close contact with each other. With the above configuration, even after the pressure-releasing step (S21) is executed, the pair of plates 44 and the connector 130 prevent the plate laminate 40 from returning to the original position, so that the corrugated portions 43 of the two adjacent plates 44 can remain in contact with each other. This increases the flow path length of the first flow path 31, thus promoting heat exchange in the plate laminate 40.

Figure 10:
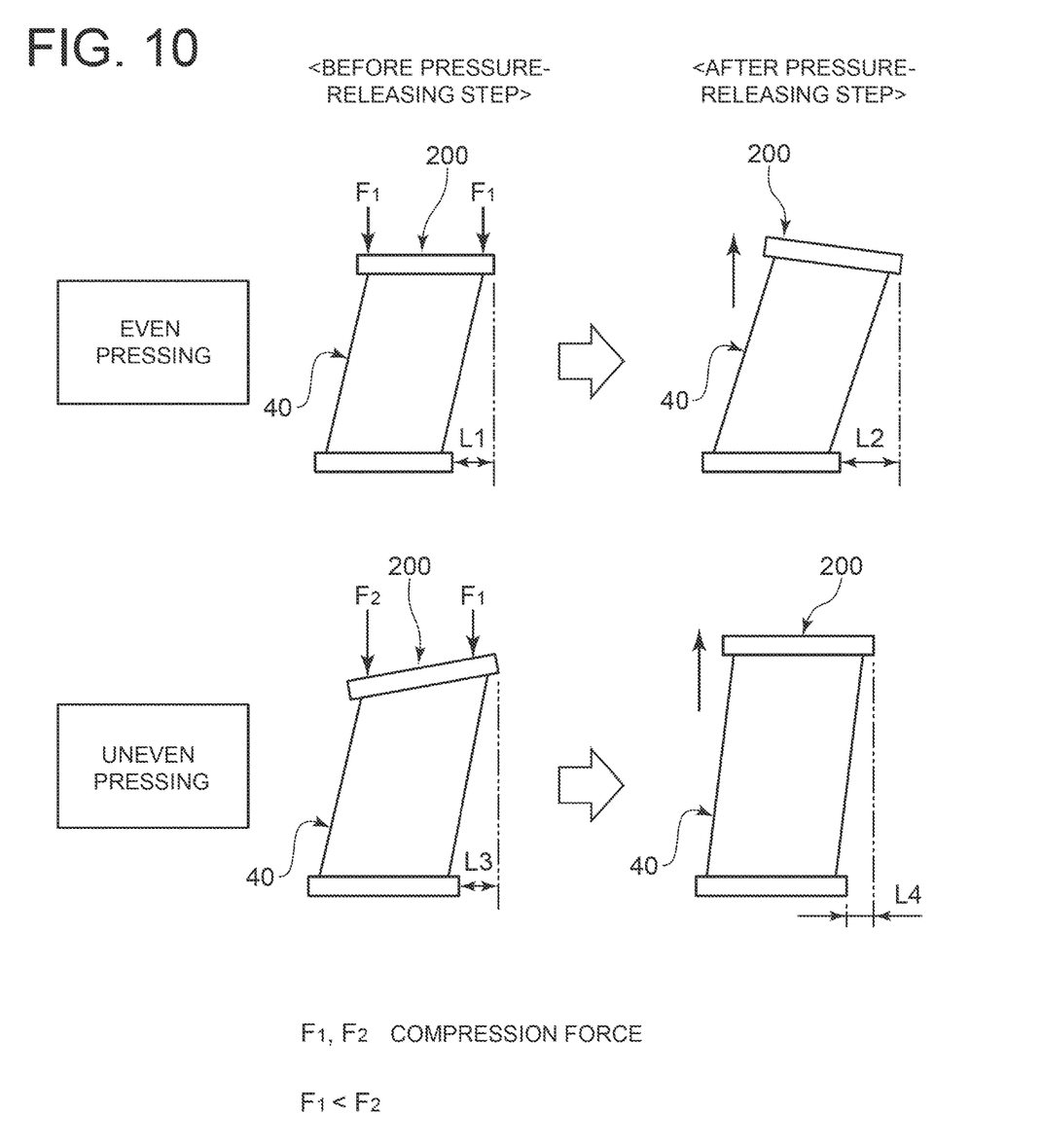
FIG. 10 is a conceptual perspective view of a plate laminate before and after the pressure-releasing step according to an embodiment.

4. Examples of Advantages of Different Pressing Forces Depending on Input Point P Referring to FIGS. 9 and 10, the advantages of different pressing forces depending on the input point P in the fastening step (S15) will be described. FIG. 10 is a conceptual perspective view of the plate laminate 40 before and after the pressure-releasing step (S21) according to an embodiment of the present disclosure. In FIG. 10, for ease of explanation, the input point P of pressing force by the pressing tool 200 is conceptually illustrated by focusing on two points.

As shown in FIG. 10, when the pressing force is released by the execution of the pressure-releasing step, the plate laminate 40 slightly returns to its original position in the laminating direction, although it is restrained by the pair of binding plates 120 and the connector 130. The amount of restoration in the laminating direction is 1% or less of the length of the plate laminate 40 in the laminating direction, more specifically 0.5% or less.

However, even if the amount of restoration is small, the plate laminate 40 may tilt with the execution of the pressure-releasing step. The reasons for the tilt are as follows.

The strain generated inside the plate laminate 40 with the execution of the fastening step (S15) is unevenly distributed in the plate laminate 40. This may be due to the fact that the plurality of plates 44 of the plate laminate 40 are not strictly identical in shape, and that there are differences in the arrangement pattern (e.g., density) of the plurality of corrugated portions 43 in a single plate 44. In particular, if the density of the corrugated portions 43 is non-uniform in a single plate 44, the amount of strain in this plate 44 is non-uniform. As a result, when pressing force is evenly applied to the plate laminate 40, the amount of restoration of the plate laminate 40 observed as a result of the execution of the pressure-releasing step (S21) becomes non-uniform, the laminating direction of the plate laminate 40 changes, and the plate laminate 40 tilts. According to the inventors' knowledge, which way it tilts depends on the positions of the plurality of input points P, the shape of the plate laminate 40, the arrangement pattern of the corrugated portions 43, the shape of each corrugated portion 43, etc. In the upper example in FIG. 10, a relatively large strain (relatively large compression) appears on one side (left side in the example of FIG. 10) in the plate laminate 40, even though pressing force is evenly applied in the fastening step. As a result, the amount of restoration in the plate laminate 40 due to the execution of the pressure-releasing step is greater on one side of the plate laminate 40, and the tilt of the plate laminate 40 increases with the execution of the pressure-releasing step. In the example of FIG. 10, dimension L2 is larger than dimension L1. The dimension L1 may be zero.

In this regard, in the present embodiment, in the fastening step (S15), an adjustment is performed to vary the pressing force in at least two of the plurality of input points P, based on the fact that the amount of restoration in the laminating direction is not uniform (lower part of FIG. 10). Accordingly, the pressing force is greater on one side, where the amount of restoration tends to be greater, so that the amount of elastic deformation of the plate laminate 40 increases on one side. The connecting step (S19) is executed in the fastening state with the amount of elastic deformation adjusted in this manner, and the plate laminate 40 with variation in the amount of elastic deformation is held (restrained) by the connector 130. Therefore, when the pressure-releasing step (S21) is executed, the amount of restoration on one side of the plate laminate 40 is reduced by the adjusted amount of elastic deformation since it is restrained by the connector 130. Thus, the amount of restoration of the plate laminate 40 becomes uniform. In the example of FIG. 10, dimension LA is smaller than dimension L2, and the tilting of the plate laminate 40 is suppressed. Therefore, the plate laminate unit 100 with suppressed tilting can be produced. The amount of uniform restoration caused in the plate laminate 40 by varying the pressing force and the amount of non-uniform restoration caused in the plate laminate 40 by equalizing the pressing force are both 1% or less of the length of the plate laminate 40 in the laminating direction, more specifically 0.5% or less.

As described above, the gap between the inner wall surface of the vessel 35 of the heat exchanger 30 and the plate laminate 40 housed in the vessel 35 should be small. In this regard, since the tilting of the plate laminate 40 is suppressed, the variation in external dimension of the plate laminate 40 can be controlled, and the plate laminate 40 with the small gap can be produced. In other words, the plate laminate 40 housed in the vessel 35 having a specified dimension can be made larger, and thus the heat exchanger 30 that promotes heat exchange between the first heating medium T and the second heating medium R in the heat exchanger 30 can be achieved.

Returning to FIG. 8, at least two input points P with different pressing forces include a pair of input points Pc. The pair of input points Pc are located on both sides of the plate laminate 40 in the longitudinal direction of the plates 44, one on each side, in laminating direction view. According to the inventors' findings, the strain generated in the plate laminate 40 with the execution of the fastening step (S15) tends to be non-uniform in the longitudinal direction of the plates 44. With the above configuration, since the compression force applied to both longitudinal ends of each of the plurality of plates 44 is non-uniform, it is possible to effectively suppress the tilting of the plate laminate 40 after the pressure-releasing step (S21) is executed.

In other embodiments, the pressing force may also vary among two or more input points P other than the pair of input points Pc of the plurality of input points P. If uneven distribution of strain in the plate laminate 40 (uneven distribution of restoration in the plate laminate 40) when the pressing force is evenly applied to the plate laminate 40 is known in advance, it is also known how to vary the pressing force among the plurality of input points P. As a result, it is possible to more effectively suppress the tilting of the plate laminate 40 after the pressure-releasing step (S21) is executed.

5. Conclusion

The contents described in the above embodiments would be understood as follows, for instance.

1) A method of producing a plate laminate unit (100) for a heat exchanger according to at least one embodiment of the present disclosure includes: a compressing step (S13, S15) of compressing a plate laminate (40), a pair of terminal plates (110) disposed on both sides of the plate laminate (40) in a laminating direction, and a pair of binding plates (120) disposed on both sides of the pair of terminal plates (110) in the laminating direction, using a pressing tool (200) from both sides in the laminating direction; a welding step (S17) of welding an edge portion (49) of the plate laminate (40) to edge portions (119) of the pair of terminal plates (110) during the compressing step (S13, S15); a connecting step (S19) of connecting the pair of binding plates (120) to each other by a connector (130) after the welding step (S17); and a pressure-releasing step (S21) of detaching the pressing tool (200) after the connecting step.

With the configuration 1), through the execution of the compressing step (S13, S15), the edge portion (49) of the plate laminate (40) can be brought into close contact with the edge portions (119) of the pair of terminal plates (110) over the entire circumferential length. Since the welding step (S17) is executed with the edge portions (49, 119) in close contact, the edge portion (49) of the plate laminate (40) can be properly welded to the edge portions (119) of the pair of terminal plates (110) over the entire circumferential length. Additionally, since the edge portions (49, 119) are welded before the connecting step (S19), the connector (130) does not interfere with the welding step (S17). From the above, it is possible to achieve the method of producing the plate laminate unit (100) for a heat exchanger by which the plate laminate (40) and the pair of terminal plates (110) can be welded easily and properly. Further, even after the pressure-releasing step (S21) is executed, the connector (130) prevents the compressed plate laminate (40) from returning to the original position, and tensile stress at the weld portions (150) generated by the welding step (S17) is suppressed. For example, even if a large force is generated to separate the plate laminate (40) from the terminal plates (110) due to a high-pressure fluid (second heating medium R) flowing through the flow path (second flow path 32) of the plate laminate (40), the connector 130 receives this force, thereby suppressing tensile stress at the weld portions (150). Therefore, it is possible to achieve the method of producing the plate laminate unit (100) for a heat exchanger that can be applied to the use of the heat exchanger (30).

2) In some embodiments, in the method of producing the plate laminate unit (100) for a heat exchanger as defined in the above 1), in the compressing step (S13, S15), different pressing forces act in at least two of a plurality of input points (P) of pressing force of the pressing tool (200) located to surround the plate laminate (40) in laminating direction view.

The strain generated in the plate laminate (40) during the compressing step (S13, S15) tends to be non-uniform. In this case, the amount of restoration of the plate laminate (40) in the laminating direction with the execution of the pressure-releasing step (S21) is not uniform. Therefore, when the pressure-releasing step (S21) is executed, the laminating direction of the plate laminate (40) changes, and the plate laminate (40) tends to tilt. In this regard, with the configuration 2), the pressing force in the compressing step (S13, S15) is varied in at least two of the plurality of input points (P) based on the fact that the amount of restoration in the laminating direction is not uniform, so that a relatively large compression force is applied to the area of the plate laminate (40) that is known to have a large restoration amount. Then, the connecting step (S19) is executed in the fastening state with the amount of elastic deformation adjusted to increase in this area, and the plate laminate (40) with variation in the amount of elastic deformation is held. As a result, the amount of restoration in the area where the amount of elastic deformation tends to increase is reduced when the pressure-releasing step (S21) is executed, and the amount of restoration of the plate laminate (40) becomes uniform. Therefore, the plate laminate unit (100) with suppressed tilting can be produced. This allows the variation in external dimension of the plate laminate (40) to be controlled. Thus, the plate laminate (40) housed in the vessel (35) of the heat exchanger (30) having a specified dimension can be made larger, and the heat exchanger (30) that promotes heat exchange can be achieved.

3) In some embodiments, in the method of producing the plate laminate unit (100) for a heat exchanger as defined in the above 2), the plate laminate (40) includes a plurality of plates (44). Each of the plurality of plates (44) has a first edge portion (71) of arc shape and a second edge portion (72) with a smaller curvature than the first edge portion. The at least two input points (P) with different pressing forces are located on both sides of the plate laminate (40) in a longitudinal direction of the plates (44), at least one on each side, in laminating direction view.

According to the inventors' findings, the strain generated in the plate laminate (40) with the execution of the compressing step (S13, S15) tends to be non-uniform in the longitudinal direction of the plates (44). With the configuration 3), since the compression force applied to both longitudinal ends of each of the plurality of plates (44) is non-uniform, it is possible to effectively suppress the tilting of the plate laminate (40) after the pressure-releasing step (S21) is executed.

4) In some embodiments, in the method of producing the plate laminate unit (100) for a heat exchanger as defined in any one of the above 1) to 3), the compressing step (S13, S15) includes: a placing step (S13) of placing a pair of pressing tables (210) included in the pressing tool (200) on both sides of the pair of binding plates (120) in the laminating direction; and a fastening step (S15) of tightening the pair of pressing tables (210), using a plurality of fastening shafts (220) included in the pressing tool (200) in a plurality of positions off the plate laminate (40), the pair of terminal plates (110), and the pair of binding plates (120) in laminating direction view.

With the configuration 4), the pair of pressing tables (210) are tightened with the plurality of fastening shafts (220) separated from the plate laminate (40), the terminal plates (110), and the pair of binding plates (120). This ensures that the plurality of fastening shafts (220) do not interfere with the execution of the welding step (S17) after the fastening step (S15). Thus, the welding step (S17) can be simplified.

5) In some embodiments, in the method of producing the plate laminate unit (100) for a heat exchanger as defined in any one of the above 1) to 4), the connecting step (S19) includes connecting edge portions (129) of the pair of binding plates (120) formed to surround the plate laminate (40) in laminating direction view by the connector (130).

With the configuration 5), since the edge portions (129) of the binding plates (120) are formed to surround the plate laminate (40) in laminating direction view, the connector (130) is separated from the plate laminate (40) and connected to the pair of binding plates (120). Therefore, the plate laminate (40) does not interfere with the execution of the connecting step (S19), and the connecting step (S19) can be simplified.

6) In some embodiments, in the method of producing the plate laminate unit (100) for a heat exchanger as defined in any one of the above 1) to 5), the plate laminate (40) includes a plurality of plates (44) each of which has a corrugated portion (43) to form a flow path (first flow path 31) for fluid (first heating medium). The compressing step (S13, S15) includes bringing the corrugated portions (43) of adjacent two of the plurality of plates (44) in the laminating direction into close contact with each other.

With the configuration 6), even after the pressure-releasing step (S21) is executed, the pair of binding plates (120) and the connector (130) prevent the plate laminate (40) from returning to the original position, so that the corrugated portions (43) of the two adjacent plates (44) can remain in contact with each other. This increases the flow path length of the flow path (first flow path 31) for fluid (first heating medium T), thus promoting heat exchange in the plate laminate (40).

REFERENCE SIGNS LIST

30 Heat exchanger
40 Plate laminate
43 Corrugated portion
44 Plate
49, 119 Edge portion
71 First edge portion
72 Second edge portion
100 Plate laminate unit
110 Terminal plate
120 Binding plate
129 Edge portion
130 Connector
200 Pressing tool
210 Pressing table
220 Fastening shaft
P, Pc Input point

The invention claimed is:

1. A method of producing a plate laminate unit for a heat exchanger, comprising:
    a compressing step of compressing a plate laminate, a pair of terminal plates disposed on both sides of the plate laminate in a laminating direction, and a pair of binding plates disposed on both sides of the pair of terminal plates in the laminating direction, using a pressing tool from both sides in the laminating direction;
    a welding step of welding an edge portion of the plate laminate to edge portions of the pair of terminal plates during the compressing step;
    a connecting step of connecting the pair of binding plates to each other by a connector after the welding step; and
    a pressure-releasing step of detaching the pressing tool after the connecting step.

2. The method of producing the plate laminate unit for the heat exchanger according to claim 1,
    wherein, in the compressing step, different pressing forces act in at least two of a plurality of input points of pressing force of the pressing tool located to surround the plate laminate in laminating direction view.

3. The method of producing the plate laminate unit for the heat exchanger according to claim 2,
    wherein the plate laminate includes a plurality of plates,
    wherein each of the plurality of plates has a first edge portion of arc shape and a second edge portion with a smaller curvature than the first edge portion, and
    wherein the at least two input points with different pressing forces are located on both sides of the plate laminate in a longitudinal direction of the plates, at least one on each side, in laminating direction view.

4. The method of producing the plate laminate unit for the heat exchanger according to claim 1,
    wherein the compressing step includes:
        a placing step of placing a pair of pressing tables included in the pressing tool on both sides of the pair of binding plates in the laminating direction; and
        a fastening step of tightening the pair of pressing tables, using a plurality of fastening shafts included in the pressing tool in a plurality of positions off the plate laminate, the pair of terminal plates, and the pair of binding plates in laminating direction view.

5. The method of producing the plate laminate unit for the heat exchanger according to claim 1,
    wherein the connecting step includes connecting edge portions of the pair of binding plates formed to surround the plate laminate in laminating direction view by the connector.

6. The method of producing the plate laminate unit for the heat exchanger according to claim 1,
    wherein the plate laminate includes a plurality of plates each of which has a corrugated portion to form a flow path for fluid, and
    wherein the compressing step includes bringing the corrugated portions of adjacent two of the plurality of plates in the laminating direction into close contact with each other.

* * * * *